Sept. 20, 1932.   G. SUNDBACK   1,878,201
PUNCHING AND FORMING MACHINE
Original Filed May 11, 1927   10 Sheets-Sheet 2

Fig. 2

INVENTOR
Gideon Sundback
BY
J. S. Wooster
ATTORNEY

Fig. 3

Sept. 20, 1932.   G. SUNDBACK   1,878,201
PUNCHING AND FORMING MACHINE
Original Filed May 11, 1927   10 Sheets-Sheet 4

INVENTOR
Gideon Sundback
BY
J. S. Wooster
ATTORNEY

Sept. 20, 1932.   G. SUNDBACK   1,878,201
PUNCHING AND FORMING MACHINE
Original Filed May 11, 1927   10 Sheets-Sheet 7

Fig. 20

Patented Sept. 20, 1932

1,878,201

UNITED STATES PATENT OFFICE

GIDEON SUNDBACK, OF MEADVILLE, PENNSYLVANIA, ASSIGNOR TO HOOKLESS FASTENER COMPANY, OF MEADVILLE, PENNSYLVANIA, A CORPORATION OF PENNSYLVANIA

PUNCHING AND FORMING MACHINE

Application filed May 11, 1927, Serial No. 190,625. Renewed January 20, 1932.

This invention relates to a machine for forming metal punchings and has particular reference to a special combination of power presses arranged to operate in series, whereby blanks are punched from a strip of metal and a plurality of operations successively performed upon each individual blank.

Among the objects of the invention are to perform a plurality of punching and forming operations upon sheet-metal with one handling of the material, to provide improved mechanisms for conveying the blanks automatically from one press to another, and to coordinate the operation of the punching, forming and conveying mechanisms so that the machine will function efficiently as a unit.

The machine illustrated herein as one embodiment of the invention is particularly adapted for forming one-piece slider blanks of the type disclosed in my Patent No. 1,661,144 dated February 28, 1928. These blanks consist of two wings having inturned edges and connected by a neck having an integral reinforcing projection. When the wings are bent to parallelism the inturned edges and the reinforcing projection divide the slider into two diverging channels. A lug is formed on one wing for the purpose of attaching a pull member whereby the slider may be moved to open and close the interlocking members of a separable fastener in the usual manner.

The present invention is not limited in its broad aspects to the production of the particular slider blanks referred to, but is generally useful in all situations where it is desired automatically and cheaply to form large numbers of like blanks and to perform a plurality of operations upon each blank.

A feature of the invention resides in a novel arrangement for ejecting the scrap material from which the blanks have been punched and for conveying the individual blanks from one press to another. The scrap, in emerging from the machine, slides over the blanks and conveys them to a point where they are engaged by successive feeder fingers. These fingers catch each blank as it is propelled forward by the scrap and convey it a predetermined distance where it is held by spring pressure until it is engaged and carried still further by the next successive feeder finger, and so on until the blank is placed in the desired position for performing another operation upon it. Another novel feature resides in a construction whereby the slider blanks, after having been partially formed, are turned 90 degrees in a horizontal plane and are then engaged separately by a revolving arm, turned over and placed in position for another operation.

In carrying out the invention, various novel combinations and sub-combinations in the controlling, feeding, forming, turning and trimming mechanisms have been used, all of which will be described in detail in connection with the accompanying drawings in which similar reference characters designate corresponding parts in the several views, and in which.

Figure 1:
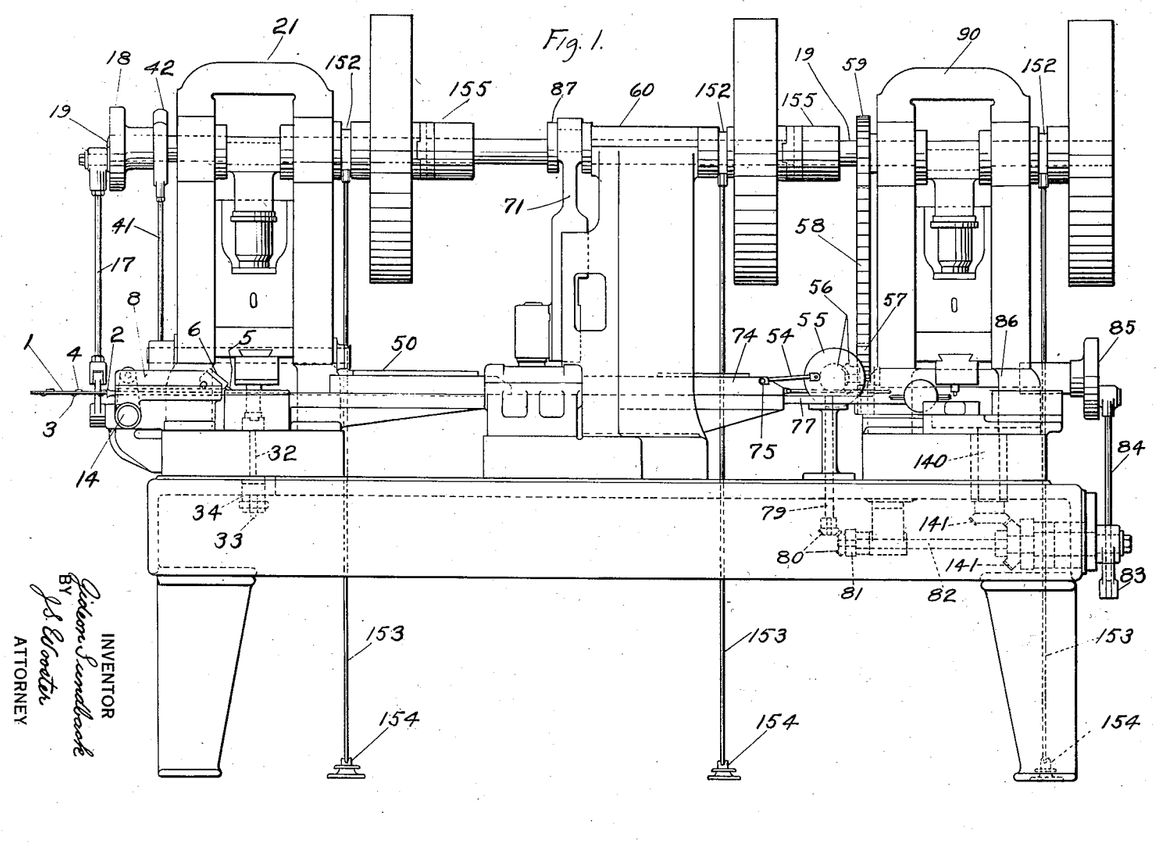
Fig. 1 is a front elevation of a machine embodying the invention.

In Fig. 1, a continuous strip of metal 1 is shown entering the machine through a guide 2. The strip 1 is provided at intervals along its length with beveled projections 3 on one side and lugs 4 on the opposite side. The location and shape of the projections 3 and lugs 4 may best be seen by referring to Figs. 4 and 7. These lugs and projections may be formed on the strip in any suitable manner as, for example, by means of dies similar to those employed in coining processes.

The projections 3, as will hereafter more fully appear, serve as a stiffening reinforce between the wings in the completed slider, while lugs 4 serve as a means for attaching a pull member to one of the wings. If it is desired to attach a pull member to each wing of the slider, it is simply necessary to provide twice as many lugs 4 in the proper places on the same side of the strip 1. In forming the slider blanks according to the present invention the projections 3 and lugs 4 also act as positioners for placing the strip 1 and the punched blanks in dies and for drawing the blanks through the machine.

The strip 1 is propelled through the guide 2 by means of a reciprocating finger 5 through successive engagement with the lugs 4. The finger 5 is mounted in a holder 6 which, in turn, is pivoted at 7 to a slide 8 acting in a slideway 9. The finger 5 may be adjusted in the holder 6 by means of an adjusting screw 10, and may be secured in any desired position by a set screw 11. The finger 5 is held down against the strip 1 by the action of a spring 12 pressing against the holder 6.

Figure 2:
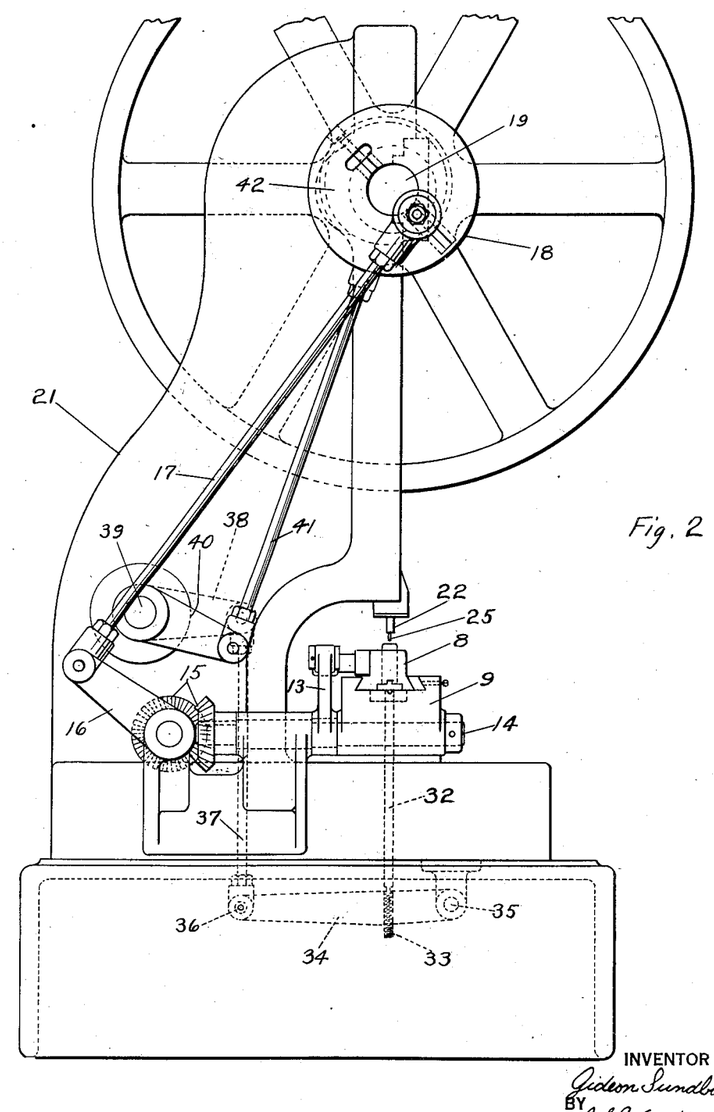
Fig. 2 is a side elevation of the blanking press, viewed from the left of Fig. 1.

The slide 8 is moved back and forth in the slideway 9 by means of a lever 13 mounted on the shaft 14 which is turned by bevel gears 15. The gears 15 are actuated by a lever 16 which is connected by a connecting rod 17 to the crank plate 18 on the main shaft 19 of the machine, as shown in Figs. 1 and 2. Accordingly, when the machine is in operation the shaft 14 which carries the lever 13 is rotated first in one direction and then in the other, thereby moving the slide 8 back and forth in the slideway 9. On the forward movement of the slide the finger 5 engages the nearest lug 4 of the strip 1 and propels the strip into the machine, and on the backward movement of the slide the finger 5 rides back over the strip into engagement with the next succeeding lug 4.

Figures 4, 7, 8, 9:
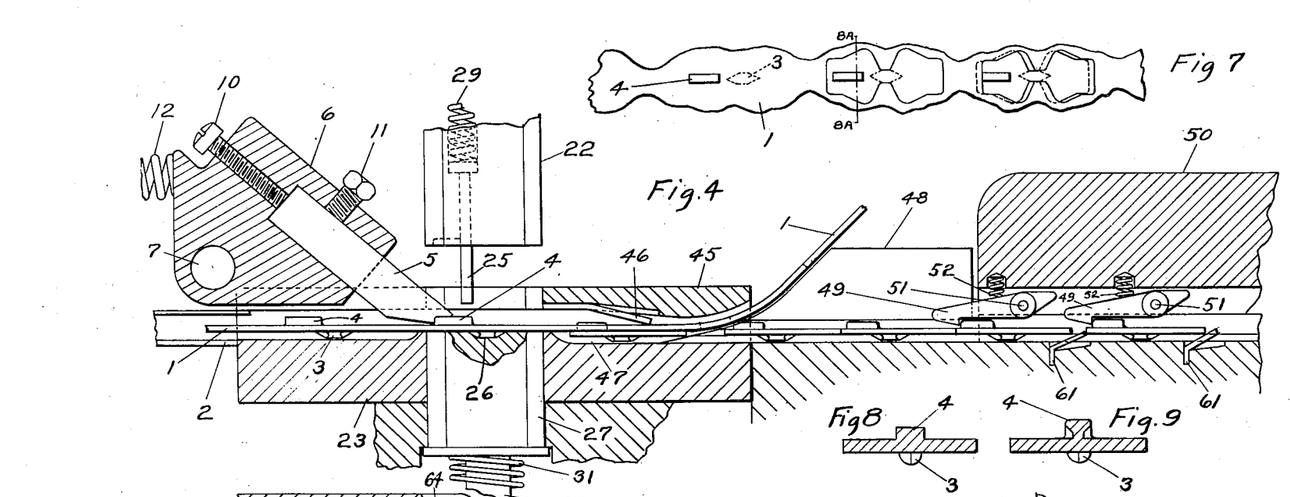
Fig. 4 is an enlarged sectional view through the blanking die and conveying mechanisms, showing the metal strip and punched blanks in different stages of progress.
Fig. 7 is a plan view showing the shape of the slider blanks and the metal strip from which they are punched.
Fig. 8 is an enlarged section of the slider blank taken on the line 8a—8a of Fig. 7.
Fig. 9 is a view similar to Fig. 8 after the indenting operation.

In this manner the strip 1 is moved into position beneath a blanking press 21. This press includes a blanking punch 22 which punches out the individual slider blanks into the die 23. On the down stroke of the punch 22 a spring plunger 25 engages the strip 1, thereby forcing the projection 3 into the recess 26 of the ejector 27 and centering the strip 1 in the proper place in the die, as shown in Fig. 4. As the punch continues on its down stroke the spring 29 is compressed, allowing the plunger 25 to recede into the punch 22. The movements of the slide 8 and the punch 22, both of which are actuated from the main shaft 19, are so timed that as the punch descends the slide carries the finger 5 back out of the path of the punch. The finger 5 continues on its back stroke to engage the next succeeding lug 4 which is in turn moved into the desired position for punching.

As the punch 22 cuts the slider blank from the strip 1, forcing the blank into the die 23, the ejector 27 which is held in position by a spring 31 is forced down, thereby compressing the spring 31 and leaving room for the newly punched slider blank to lie in the die. As the punch 22 draws out of the die the ejector 27 is actuated by the spring 31 to press the punched blank back on top of the die. In order to avoid reliance solely upon the spring 31 to force the blank on top of the die as the punch 22 withdraws, a positive movement is also provided. This as accomplished by means of a rod 32 which exerts pressure on the ejector 27 limited in its upward movement to a position where the top surface comes flush with the surface of the blanking die. The rod 32, as shown in Fig. 2, is threaded at 33 to a lever 34 having one end pivoted at 35 to the frame of the machine and the other end pivoted at 36 to a connecting rod 37. The rod 37 is acted on by a lever arm 38 mounted on shaft 39. The shaft 39 is rotated by means of a lever arm 40 which is connected by connecting rod 41 to an eccentric 42 on the main shaft 19.

The stripper plate 45 provides sufficient clearance to allow the blank to lift the strip 1 when it is ejected from the die. Accordingly, as the strip 1 is fed forward it slides upon the newly punched blank until the edge of the hole from which the blank was punched engages the lug 4 thereby carrying the blank along under the scrap. The spring 46 exerts pressure upon the strip 1 so that as soon as the punched blank has been carried out of the operating plane of the punch 22 it is forced down into the guideway or recess 47 which allows for the double thickness of the metal. Thus the strip 1 again lies flat upon the die 23 awaiting the next descent of the punch 22.

The scrap material from which the slider blanks have been punched passes over curved guide members 48 which are spaced far enough apart to allow the individual slider blanks to continue in a straight line between them. The scrap material is thus curved upwardly and fed out of the machine, while each of the blanks is moved by its successor until it is brought to a position where it is engaged and further propelled by feeder fingers 49. The condition of the metal strip 1 in various stages of its travel is shown in Fig. 7, the left hand portion of this figure showing the strip as it enters the machine, the central portion showing how the slider blank is punched from the strip, and the right hand portion showing a newly punched blank being carried along under the strip just before the strip is fed out of the machine as scrap material.

Figure 3:
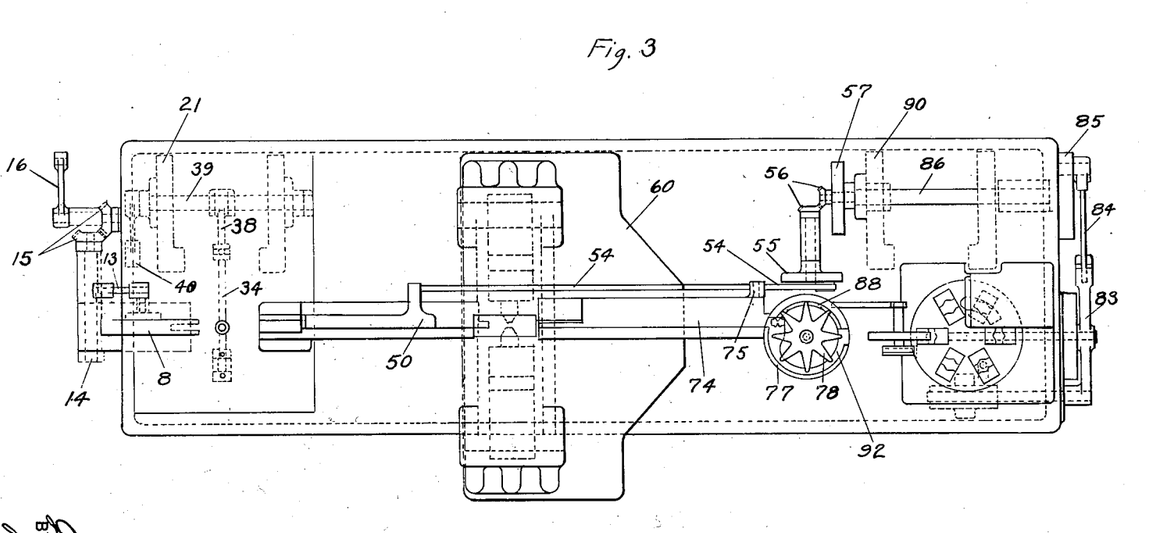
Fig. 3 is a plan view of the machine with the main shaft and associated mechanisms omitted in order to simplify the showing.

The feeder fingers 49 are pivoted to a slide 50 as at 51, and are provided with springs 52 for pressing the fingers into engagement with the slider blanks. The slide 50 is given a reciprocating motion by means of a connecting rod 54 and crank plate 55, as shown in Figs. 1 and 3. The crank plate 55 is rotated by bevel gears 56, turned by sprocket 57 and chain 58 from sprocket 59 mounted on the main shaft 19. As the slide 50 moves toward the indenting press 60 the individual blanks are carried forward by the feeder fingers 49, while on the back stroke the feeder fingers slide over the blanks. In order to prevent the slider blanks from being moved backward on the back stroke of the slide 50 a plurality of latches 61 are provided in the base of the guideway through which the blanks pass. These latches are of bent spring material and are easily pressed down by a slider blank as it moves forward, and spring up again after the slider blank has cleared the end of the latch, thereby locking the slider blank against back travel. A special feeder finger 63 having suitable tension springs 64 is mounted on the end of the slide 50 to successively engage and place each blank in the proper position in the indenting press 60.

Figure 5:
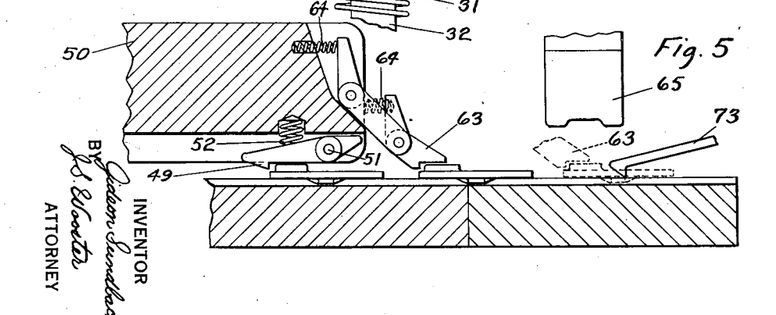
Fig. 5 is a side view, partly in section, showing the feeder fingers placing blanks in position to be operated on by an indenting press.
Figure 6:
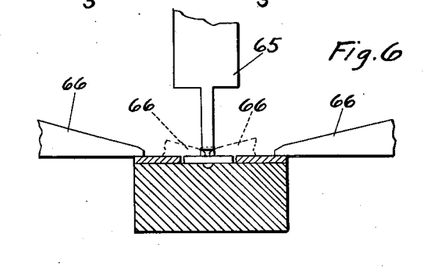
Fig. 6 is a front view, partly in section, of the indenting press.
Figure 10:
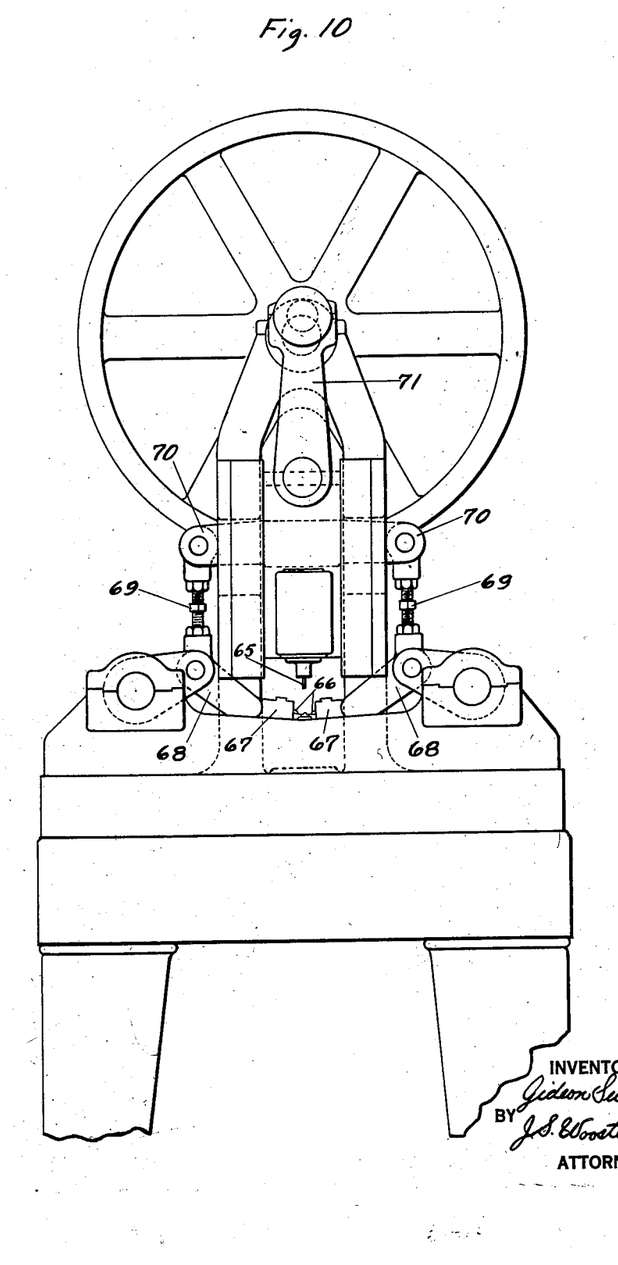
Fig. 10 is a side view of the indenting press.
Figures 11, 12:
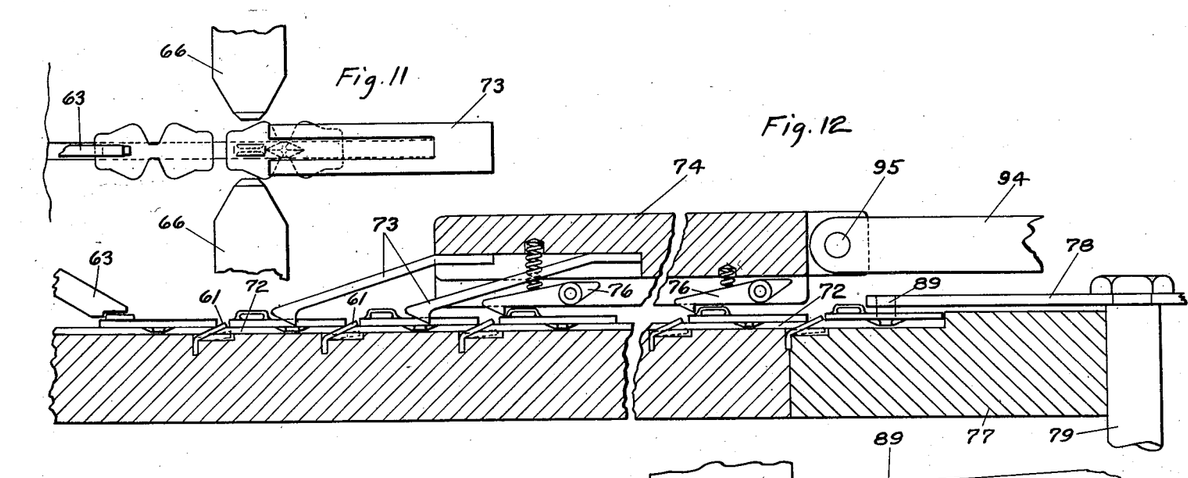
Fig. 11 is a plan view showing one slider blank in position for indenting and another slider blank being moved into position for indenting.
Fig. 12 is a sectional view taken longitudinally through the conveyor, showing how the slider blanks are conveyed from the indenting press to a rotary feeder.

When a slider blank has been placed in the desired position in the indenting press, as shown in dotted lines in Fig. 5, it is held in place by punch 65 which, with the down stroke of the press, engages and holds it while indenting tools 66 travel into the position shown in dotted lines in Fig. 6, indenting both sides of the lug 4 as shown in enlarged cross-section in Fig. 9. The indenting tools 66 are held in sliding holders 67 which are actuated by toggle joints 68 and connecting rods 69 from gate extensions 70 carried by the vertically reciprocating crosshead, as shown in Fig. 10. The sliding gate, of which the extensions 70 form a part, also holds the punch 65 and is actuated by a connecting rod 71 from the crank 87 on the main shaft 19. On the up stroke of the indenting press the punch 65 rises and the indenting punches 66 move outwardly, leaving the slider blank free to be moved by conveyor fingers 73, as shown in Figs. 11 and 12. The projections 3 of the slider blanks rest in a longitudinal guideway 72 which serves to guide the blanks in a straight line. The fingers 73 have projections or hooks that engage and conform to the shape of the slider blank between the wings, as clearly shown in Fig. 11. These fingers are mounted on a conveyor slide 74 which is driven reciprocally by the rod 54 connected thereto at 75, as shown in Figs. 1 and 3. The feeder fingers 73 engage the blanks at the time of the down stroke of the press 60.

Figure 13:
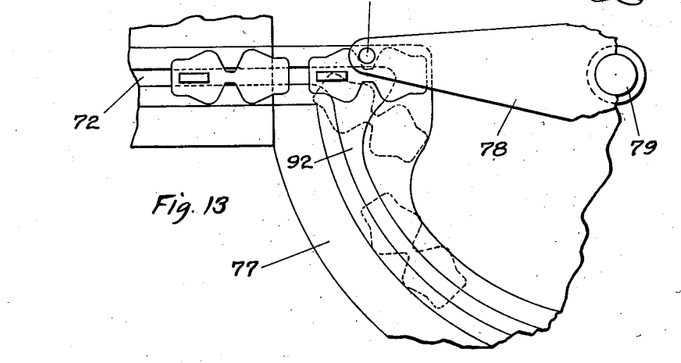
Fig. 13 is a fragmentary plan view showing how the slider blanks enter the rotary feeder.

The slider blanks, having been thus released from the indenting press, are next successively engaged and pulled by fingers 76 onto a table 77 of a rotary feeder. The rotary feeder includes a plurality of feeder arms 78, illustrated as being eight in number, which are mounted on a shaft 79. The arms 78 on shaft 79 are actuated by bevel gears 80 through ratchet 81 mounted on shaft 82, lever arm 83, connecting rod 84, crank plate 85, shaft 86, sprocket 57, and chain 58 from sprocket 59 on the main shaft 19, as illustrated in Fig. 1. As each slider blank is placed on the feeder table 77 a pin 89, one of which is carried by the end of each arm 78, engages the blank and turns it 90 degrees in a horizontal plane in the manner shown in dotted lines in Fig. 13. While turning, the rear end of each blank is retarded by contact with the sharp corner of the ledge forming the track 92, as shown in Fig. 13. The pins 89 move in a circular clearance groove 88 in the table 77. At each stroke of the forming press 90 each blank is moved one-eighth of a revolution guided by the track 92 in the feeder table 77, and moved by pin 89 of arm 78 until it arrives at the opposite side of the feeder table from whence it started. As each blank arrives at the opposite side of the feeder table it is picked up by a revolving arm, carried in a vertical plane through an arc of 180 degrees and placed in position in the forming press 90 for forming side flanges on the wings of the slider blank. The novel manner in which this is accomplished will now be described.

Figure 16:
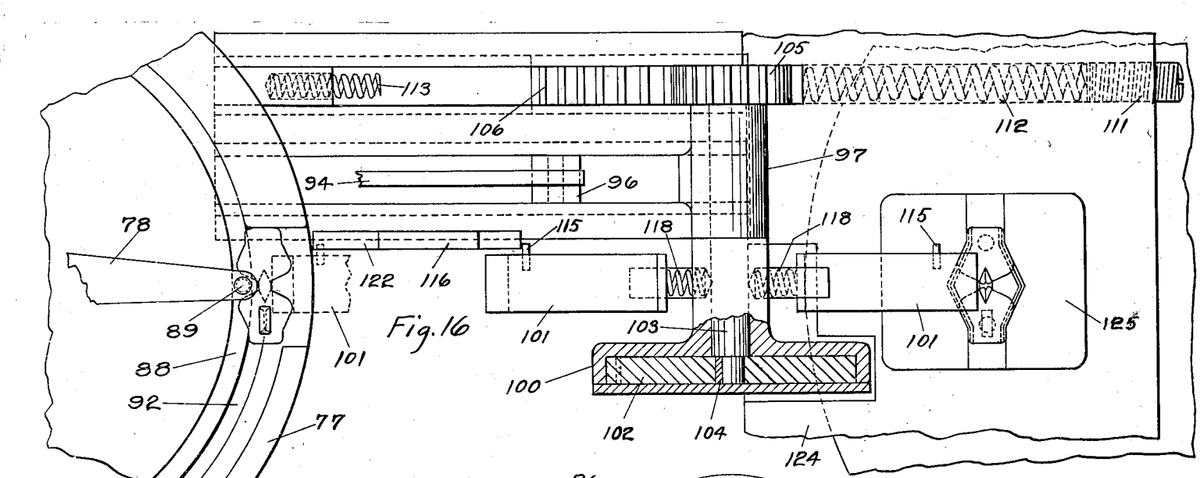
Fig. 16 is a plan view of the turning over mechanism.
Figure 17:
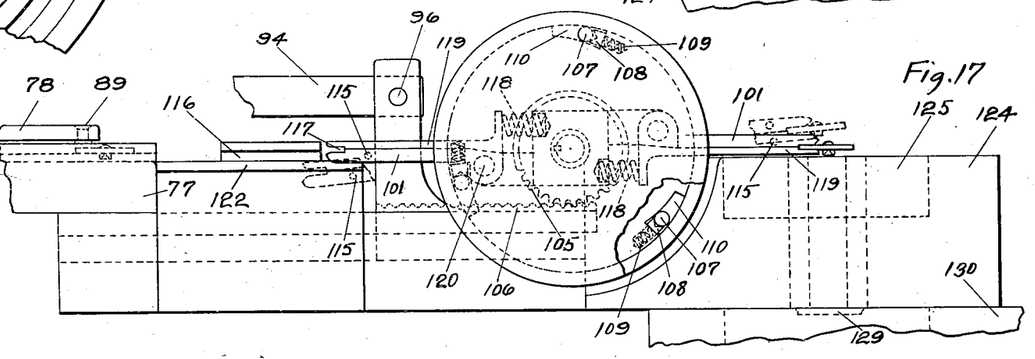
Fig. 17 is a front view of the structure shown in Fig. 16.

As the conveyor slide 74 moves on its back stroke it carries with it an arm 94 which has one end pivoted thereto at 95, as shown in Fig. 12, and has the other end attached at 96 to a slide bracket 97, as shown in Figs. 14 to 17 inclusive. The slide bracket 97 carries a friction ratchet drum 100 and a pair of carrying arms 101 which are arranged to be driven by a ratchet barrel 102 keyed to the shaft 103 at 104, as shown in Figs. 16 and 17. The arms 101 are disposed at an angle of substantially 180° to each other. The shaft 103, and consequently the ratchet barrel 102, is actuated by a gear 105 and cooperating slidable rack 106. The ratchet barrel 102 acts upon the ratchet drum 100 through rollers 107, V-shaped blocks 108, and springs 109 which are mounted in recesses 110 of progressively varying depth in the periphery of the ratchet barrel, so that the ratchet drum 100 and the carrying arms 101 will be driven only when the ratchet barrel 102 is turned in a clockwise direction. When the ratchet barrel 102 turns in a counter-clockwise direction the rollers 107 will not engage the ratchet drum 100.

As the arm 94 draws the slide bracket 97 toward the feeder table 77 the gear 105, of course, moves with the slide bracket. A spring 112 which acts on the rack 106 causes the rack 106 to move in the same direction and at the same speed as the slide bracket 97. The tension of spring 112 may be adjusted by means of a screw 111. During the period when the gear 105 and the rack 106 are traveling in the same direction at the same speed no rotary motion will be imparted to the gear 105. As the rack 106 continues to move, however, it comes in contact with a spring 113 which tends to counteract the pressure of the spring 112 until the inertia of the bracket 97 and associated mechanisms which compress the spring 113 is overcome and the pressure exerted by the two springs becomes equalized, whereupon the rack 106 is brought to a stop. As the slide bracket 97 continues to move, carrying the gear 105 over the now stationary rack 106, the gear 105 and the shaft 103 rotate, thereby turning the ratchet barrel 102 in a counter-clockwise direction. However, due to the construction of the friction clutch, described above, the rollers 107 do not engage the ratchet drum 100 when the barrel 102 is turned in a counter-clockwise direction, and hence the carrying arms 101 do not rotate at this time but remain in a substantially horizontal plane.

Even a small amount of friction existing between the ratchet drum 100 and the ratchet barrel 102 under the conditions described above might tend to cause the ratchet drum to revolve. Hence, in order to avoid reliance solely upon the inertia of the arms 101 to hold them in the same plane after the ratchet barrel 102 starts revolving, the arms 101 are provided with pins 115 which enter a groove 116 as the arms move toward the feeder table 77 and before the rotation of the ratchet barrel 102 commences. Thus the arms 101 are positively held against rotation while traveling toward the feeder table. When an arm reaches the feeder table it receives a slider blank within the recess 117 and holds it firmly therein due to the pressure exerted by spring 118 on the upper jaw member 119 which is pivoted at 120 to the lower portion of the carrying arm 101.

At the time the carrying arm 101 grasps a slider blank the slide bracket 97 has reached the limit of its back stroke and thereupon starts its forward travel. The spring 113 having been compressed by the travel of the rack 106 on the back stroke as described above, now expands and actuates the rack 106 on the forward movement of the slide bracket 97. The rack 106 continues to move until the pressure of the springs 112 and 113 is again equalized, at which time it comes to rest while the slide bracket 97 continues its forward movement. The movement of the slide bracket 97 while the rack 106 is stationary causes the gear 105 to revolve, thus turning the ratchet barrel 102 through the shaft 103. The rollers 107 thereupon engage the ratchet drum 100 causing it and the carrying arms 101 to revolve in a clockwise direction along with the ratchet barrel 102. As the slide bracket 97 continues its travel the arms 101 are carried forward and rotated at the same time until the arm containing the slider blank moves into the dotted position shown at the right of Fig. 17 while the empty arm moves into the dotted position shown at the left of Fig. 17. With the empty arm in this position the pin 115 comes in contact with the lower surface of the track 122 thereby stopping the rotary motion of the arms. However, as the slide bracket 97 continues to move forward the pin 115 slides along the under side of the track 122 until it slips over the end of the track and permits the arms 101 to continue their rotation until the arm carrying the slider blank comes in contact with the die holder 124.

Figure 14:
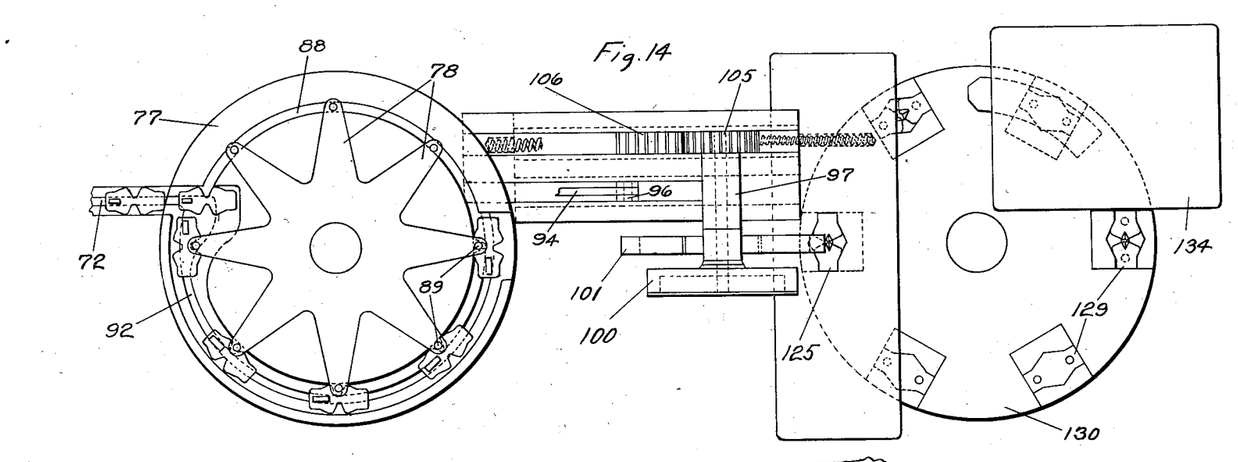
Fig. 14 is a plan view showing the mechanism for moving the slider blanks through the rotary feeder, the turning over mechanism, and the forming and shearing operation.
Figure 15:
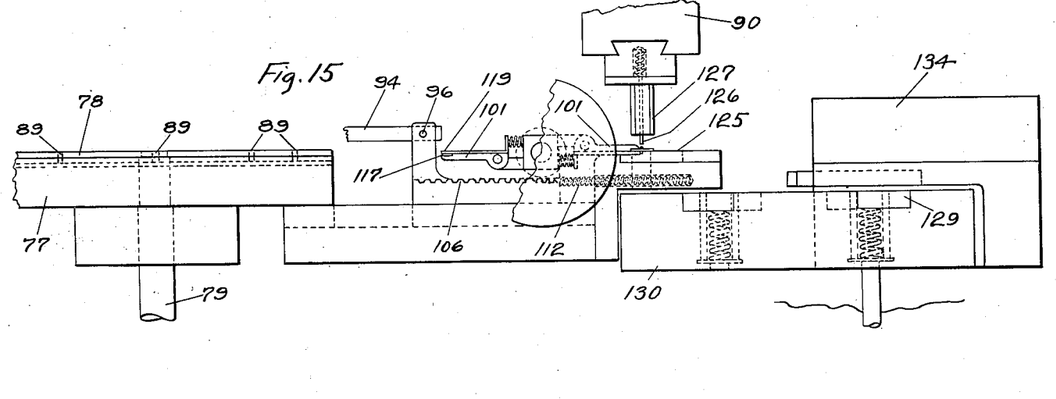
Fig. 15 is a front view of the structure shown in Fig. 14.
Figures 18, 19, 21:
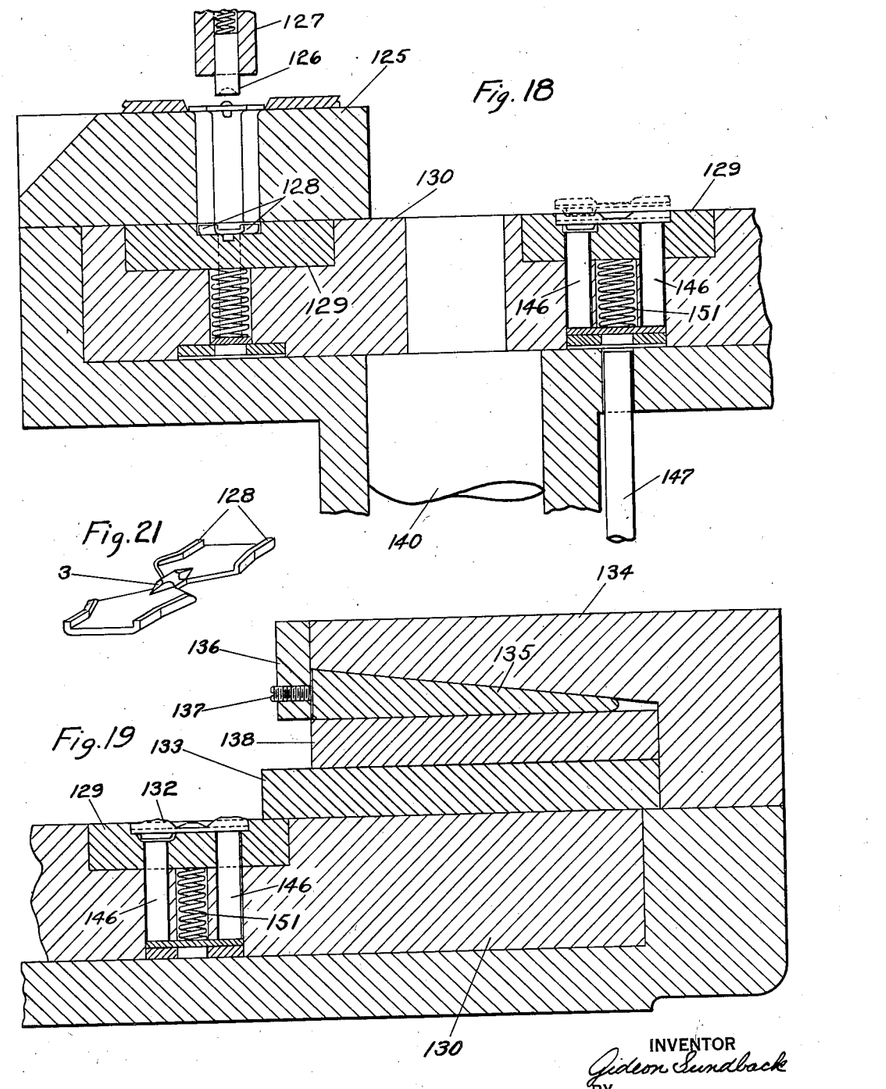
Fig. 18 is a sectional view through the dial which carries the slider blanks under the shearing mechanism.
Fig. 19 is a sectional view through the dial, showing the shearing mechanism.
Fig. 21 is a perspective view of the finished slider blank.

As a result of the operation described above, the slider blank is placed in the die 125, as shown in Figs. 14 to 17, inclusive, and is held in place in the die by the spring plunger 126 on the down stroke of the punch 127. The slide bracket 97 then moves on its back stroke, carrying the arms 101 while the slider blank remains firmly held in the die 125 by the spring plunger 126. The punch 127 forms side flanges 128 on the wings of the slider blank, and carries the slider blank down through the die 125 into a nest 129 in a rotatable dial 130, as shown in Fig. 18. The nests 129 in the dial 130 are six in number, as shown in Fig. 14, and the dial is moved one-sixth of a revolution at each stroke of the forming press 90. The forming operation leaves the flanges 128 of the slider blanks rough and of unequal magnitude as shown at 132 in Fig. 19, and it is necessary to shear off this unevenness in order to make the blanks as nearly perfect and uniform as possible. Accordingly, as the dial 130 rotates carrying the slider blanks in the nests 129 it passes under a knife 133 which is mounted in a holder 134, thereby shearing off the surplus metal and leaving the flanges of the slider blank smooth as shown in Fig. 21. The position of the knife 133 may be adjusted by means of a wedge 135, clamping block 136, set screw 137 and spacer block 138 or in any other suitable manner.

Figure 20:
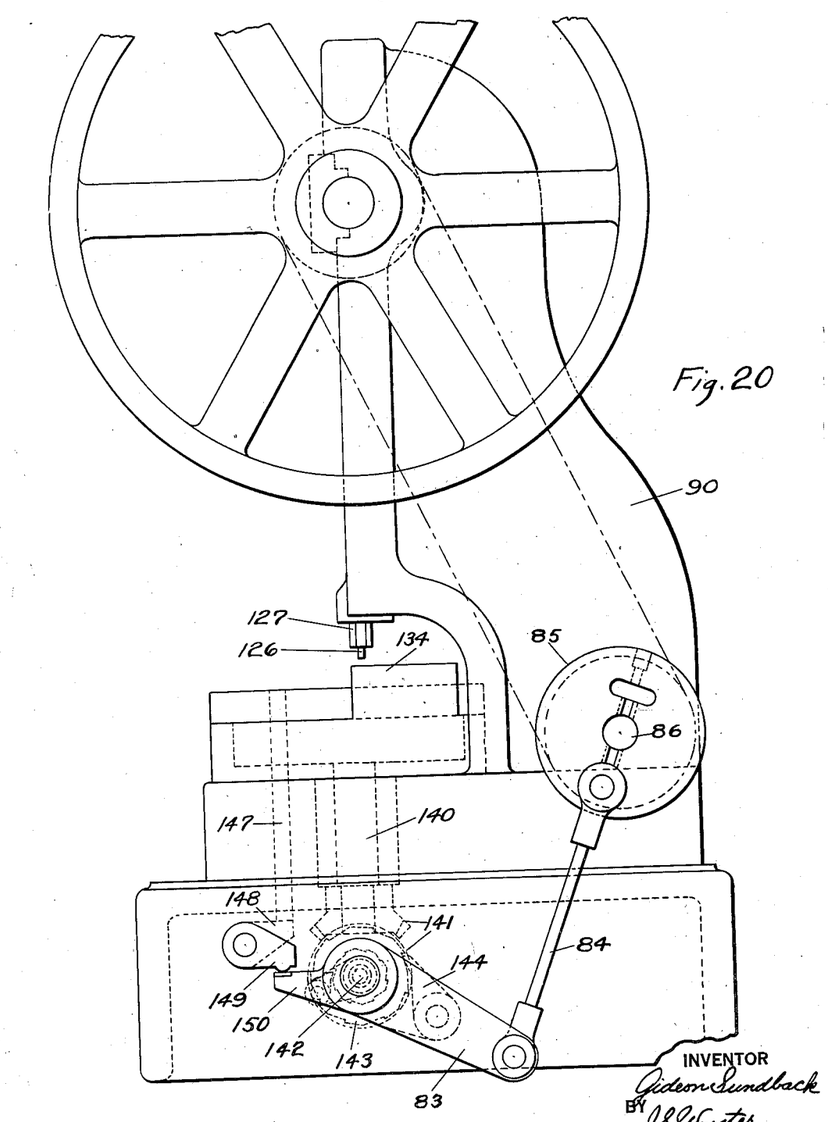
Fig. 20 is an end view of the forming press.

The dial 130 is moved intermittently, as described above, only one-sixth of a revolution being made at each stroke of the press 90. The movement of the dial is controlled by the shaft 140, through bevel gears 141, shaft 142, ratchet 143, pawl 144, arm 83, connecting rod 84, crank plate 85, shaft 86, sprocket 57, chain 58 and sprocket 59 mounted on the main shaft 19. When the slider blank has passed under the shearing knife 133 the dial 130 stops to allow another blank to be placed in the next succeeding nest 129. At the same time, the finished blank is ejected by means of pins 146 as illustrated in Fig. 18. The pins 146 are acted on by an ejector rod 147 which, in turn, is acted on by levers 148 and 149 and the projecting portion 150 of the arm 83 as shown in Fig. 20. A spring 151 presses the ejector pins 146 back into place when the action of the rod 147 is relieved, as shown in Fig. 18. The wings of the completed blank shown in Fig. 21 may be bent to parallelism in any suitable manner, and a pull member clinched upon the indented sides of the lug 4. When bent in this manner the projection 3 forms an integral reinforce between the two parallel wings and, with the flanges 128, divides the slider into two diverging channels.

The presses 21, 60 and 90 are each controlled individually from the main shaft 19 through an individual clutch 152, a connecting rod 153 and foot treadle 154. As a further measure where it is desired to cut out one or more presses from operation and at the same time continue other parts of the machine in operation, the couplings 155 are provided whereby each press may be disconnected from the others.

It will be obvious that various changes may be made in the details of construction and method of operation herein shown and described without departing from the scope and spirit of the invention as defined by the appended claims.

The invention claimed is:

1. The combination with means for feeding a strip of material, of means for punching blanks from said material, means acting on each newly punched blank to cause it to move the preceding blanks forward, and inclined guide members for guiding the scrap material away from said blanks and spaced far enough apart to allow said blanks to pass between them.

2. The combination with means for feeding a strip of material, of means for punching blanks from said material, a substantially horizontal guideway for carrying said blanks forward, means for positioning the blanks in said guideway to cause them to move the preceding blanks therein, and a pair of inclined side walls for said guideway to guide the scrap material away from said blanks and spaced far enough apart to allow said blanks to pass between them.

3. The combination with means for feeding a strip of material, of a punch for punching blanks from said material, a guideway for carrying said blanks out of the operating path of said punch, means for placing said blanks in said guideway in a position to be propelled by the scrap material, a pair of inclined side walls for guiding the scrap material out of said guideway and spaced far enough apart to allow said blanks to pass between them, and a plurality of reciprocating fingers adapted to engage and propel said blanks when moved forward and to ride over said blanks when moved backward.

4. The combination with means for feeding a strip of material containing a plurality of projections, of means acting on said strip to punch out blanks each containing a projection, and means for separating the punched blanks from the scrap material a sufficient distance to permit portions of said scrap material to engage said projections to carry said blanks forward.

5. The combination with means for feeding a strip of material containing a plurality of projections, of means acting on said strip to punch out blanks each containing a projection, a guideway accommodating the double thickness of said material, and means for forcing the punched blanks below the scrap material, said guideway to permit the edges of the scrap material which originally contained said blanks to engage said projections and thereby carry said blanks forward.

6. The combination with means for feeding a strip of material containing a plurality of projections, of means acting on said strip to punch out blanks each containing a projection, means for separating the punched blanks from the scrap material a sufficient distance to permit portions of said scrap material to engage said projections to carry said blanks forward, means for guiding said scrap material away from said blanks, and means for conveying said blanks forward in a substantially horizontal plane.

7. The combination with means for feeding a strip of material containing a plurality of projections, of means acting on said strip to punch out blanks each containing a projection, a guideway accommodating the double thickness of said material, means for forcing the punched blanks into said guideway to permit the edges of the scrap material which originally contained said blanks to engage said projections and thereby carry said blanks forward, an inclined surface for guiding said scrap material away from said blanks and permitting each blank to be propelled along said guideway by its successor, and a reciprocating member adapted to engage the projections of said blanks to continue their movement in said guideway.

8. The combination with means for feeding a strip of material containing a plurality of projections, of means acting on said strip to punch out blanks each containing a projection, a guideway accommodating the double thickness of said material, means for forcing the punched blanks into said guideway to permit the edges of the scrap material which originally contained said blanks to engage said projections and thereby carry said blanks forward, inclined guide members for guiding said scrap material away from said blanks and spaced far enough apart to allow said blanks to continue in a straight line between them, a reciprocating spring-pressed finger adapted to engage said projections when moved in one direction and to ride over said projections when moved in the opposite direction, and a plurality of spring-pressed latches in said guideway to limit the backward movement of said blanks.

9. A conveyor comprising a substantially straight guideway, means for intermittently feeding blanks through said guideway, a circular track having an eccentric portion communicating with said guideway, and means intermittently engaging said blanks to turn them in said eccentric portion and propel them along said track.

10. A conveyor comprising a substantially straight guideway, means for feeding blanks through said guideway, a circular track communicating with said guideway, a plurality of arms rotatable about the center of said circular track as an axis, and means on said arms to engage said blanks and propel them along said track.

11. A conveyor comprising a substantially straight guideway, means for feeding blanks through said guideway, a circular track communicating with said guideway, a plurality of arms rotatable about the center of said circular track as an axis, means on said arms to engage said blanks and propel them along said track, and means in said track to turn said blanks at an angle to the position they occupy in said guideway.

12. A conveyor comprising means for feeding blanks in a horizontal plane, carrying arms having means for separately engaging said blanks, means for moving said arms toward and away from said feeding means, and means for rotating said arms in a vertical plane.

13. A conveyor comprising means for feeding blanks in a horizontal plane, a plurality of carrying arms having means for separately engaging said blanks, means for moving said arms toward and away from said feeding means, and means for rotating said arms in a vertical plane during a portion of their movement away from said feeding means.

14. A conveyor comprising blank feeding means, a bracket movable toward and away from said feeding means, arms on said bracket having jaws for separately engaging said blanks, and means including a friction clutch for rotating said arms in response to the movement of said bracket in one direction.

15. A conveyor comprising blank feeding means, a bracket movable toward and away from said feeding means, an arm on said bracket having a spring-pressed jaw for separately engaging said blanks, and means including a friction clutch for rotating said arm during a portion of the movement of said bracket in one direction.

16. A conveyor comprising a substantially straight guideway, means for feeding blanks through said guideway, a circular track communicating with said guideway, means for conveying said blanks along said track to a point diametrically opposite said guideway, a bracket slidable toward and away from said circular track, arms on said bracket having jaws for separately engaging said blanks, and means including a friction clutch for rotating said arms during a portion of the movement of said bracket away from said track.

17. A conveyor comprising blank feeding means, a bracket movable toward and away from said feeding means, arms on said bracket having jaws for separately engaging said blanks, a gear movable with said bracket, a friction clutch between said gear and said arms to cause said arms to rotate in response to the movement of said gear in one direction only, a rack meshing with said gear, and means for moving said rack at the same speed as said gear during a portion of the movement of said bracket to prevent said arms from rotating.

18. A conveyor comprising blank feeding means, a bracket movable toward and away from said feeding means, arms on said bracket having jaws for separately engaging said blanks, a gear mounted on said bracket, a friction clutch connecting said gear to said arms and capable of rotating said arms in only one direction, a rack meshing with said gear, a spring acting on said rack to cause it to move at the same speed as said gear during a portion of the travel of said bracket, and a second spring acting on said rack to oppose the action of said first mentioned spring at an intermediate point in the travel of said bracket.

19. A conveyor comprising a guideway, means for feeding blanks through said guideway, a circular track communicating with said guideway, means in said track for turning said blanks at an angle to the position they occupy in said guideway, means for conveying said blanks along said track to a point diametrically opposite said guideway, a forming tool at a point remote from said track, a bracket movable between said track and said forming tool, carrying arms on said bracket having jaws for separately engaging said blanks, a gear mounted on said bracket, a friction clutch connecting said gear to said arms and capable of rotating said arms only when said bracket moves toward said forming tool, a rack meshing with said gear, and means for moving said rack at the same speed as said gear during a portion of the travel of said bracket in either direction.

20. The combination with means for feeding a strip of material, of means for punching blanks from said material, a guideway for guiding said blanks forward, a reciprocating finger adapted to engage and successively propel said blanks through said guideway, an arcuate track having an eccentric portion communicating with said guideway, and a plurality of rotating arms having means for engaging said blanks to turn them in said eccentric portion and propel them along said track.

21. The combination with means for feeding a strip of material, of means for punching blanks from said material, a guideway for guiding said blanks forward in a straight line, a reciprocating finger adapted to engage and propel said blanks through said guideway, a circular track having an eccentric portion communicating with said guideway, a plurality of arms rotatable about the center of said circular track as an axis, means for intermittently rotating said arms at a speed to cause them to engage said blanks as they arrive at the end of said guideway, and pins on the ends of said arms for engaging said blanks to turn them in said eccentric portion and propel them along said track.

22. The combination with means for feeding a strip of material, of means for punching blanks from said material, means for separating the scrap material from said blanks, means for intermittently moving said blanks forward, means for successively indenting said blanks, means for turning the indented blanks at right angles, means for turning said blanks over, and means for successively forming the turned blanks.

23. The combination with means for feeding a strip of material, of means for punching blanks from said material, means for separating the scrap material from said blanks, means for intermittently moving said blanks forward, means for successively indenting said blanks, means for turning the indented blanks in a horizontal plane, means for turning said blanks over in a vertical plane, and means for successively forming the turned blanks.

24. The combination with means for feeding a strip of material, of means for punching blanks from said material, means for separating the scrap material from said blanks, means for moving said blanks forward, means for successively indenting said blanks, means for turning the indented blanks in a horizontal plane, means for turning said blanks over in a vertical plane, and means for forming flanges on said blanks.

25. The combination with means for feeding a strip of material, of means for punching blanks from said material, means for separating the scrap material from said blanks, means for moving said blanks forward, means for successively indenting said blanks, means for turning the indented blanks in a horizontal plane, means for turning said blanks over in a vertical plane, means for forming side flanges on said blanks, and means for shearing said flanges to remove uneven edges therefrom.

26. The combination with means for feeding a strip of material, of means for punching blanks from said material, means for separating the scrap material from said blanks, means for moving said blanks forward, a press for successively indenting said blanks, means for turning the indented blanks in a horizontal plane, a rotary conveyor having means for separately engaging said blanks and turning them over in a vertical plane, a punch for forming flanges on the turned blanks, an intermittently operating rotary dial cooperating with said punch to receive and convey the formed blanks, and a knife in close proximity to said dial in the path of said blanks to shear uneven edges from said flanges.

27. The combination with a guideway, of means for moving blanks therethrough, and a bent spring having one end inclined at an angle in said guideway to permit said blanks to pass over it in only one direction.

28. The combination with means for feeding a strip of material, of means for punching blanks from said material, a reciprocating finger adapted to engage and propel said blanks when moved forward and to ride over said blanks when moved backward, and a flat spring disposed at an angle in the path of said blanks and adapted to be depressed by a blank when moved forward and to spring up when the blank has passed to prevent it from moving backward.

29. The combination with means for feeding blanks, of a pair of blank carrying arms disposed at an angle of substantially 180° to each other, means for moving said arms toward and away from said feeding means so that one arm may engage a blank and convey it away from said feeding means, and means for rotating said arms through an angle of 180° during their movement away from said feeding means to turn over the blank carried by one arm and to place the other arm in position to engage a blank on its return movement toward said feeding means.

30. The combination with means for feeding blanks, of a blank carrying arm reciprocable toward and away from said feeding means, means for rotating said arm during a portion of its movement, and means adjacent said feeding means adapted to engage said arm to prevent it from rotating.

31. The combination with means for feeding blanks, of a blank carrying arm, means for moving said arm toward and away from said feeding means to receive a blank and convey it away from said feeding means, means for rotating said arm during its movement away from said feeding means to turn the blank over, a pin on said arm, and a groove adjacent said feeding means adapted to receive said pin to prevent said arm from rotating.

32. The combination with means for feeding blanks, of a pair of blank carrying arms disposed at an angle of substantially 180° to each other, means for moving said arms toward and away from said feeding means to permit one arm to receive a blank and convey it away from said feeding means, means for rotating said arms during their movement away from said feeding means to turn the blank over and move the empty arm into position to receive a blank on the return movement toward said feeding means, a pin on each arm, and a groove adjacent said feeding means to receive such pin to prevent said arms from rotating.

33. The combination with means for feeding blanks, of a blank carrying arm, means for moving said arm toward and away from said feeding means to receive a blank and convey it away from said feeding means, means for rotating said arm during its movement away from said feeding means to turn the blank over, a forming press remote from said feeding means to receive the blank from said arm, and means associated with said press to engage said blank and hold it as said arm moves back toward said feeding means.

34. The combination with automatically operable means for feeding substantially flat metal blanks each having a projection thereon, of means operable in unison with said feeding means for indenting opposite sides of the projection to form recesses.

35. The combination with means for feeding a series of blanks each having a projection thereon, of pressure applying means engaging said projection to hold said blanks stationary, and forming tools movable into said projection while so held to form recesses on opposite sides of the same.

36. The combination with means for feeding a series of blanks each comprising a substantially flat piece of metal with a projection on one side thereof, of horizontally reciprocating tools movable into engagement with said projection to form indentations on opposite sides of the same and another reciprocating tool for applying pressure to said projection during the indenting process.

37. The combination with means for feeding a series of blanks each comprising a substantially flat piece of metal with an upward projection thereon, of vertically reciprocating means for engaging said projection to hold the blank stationary, and horizontally reciprocating indenting tools for forming recesses or opposite sides of said projection.

38. In a slider blank forming machine, means for receiving and holding a blank with an integral projection thereon, including reciprocating means for applying holding pressure to said projection, and opposed indenting tools for forming indentations in opposite sides of said projection.

39. In a slider blank forming machine, automatically operable means for feeding a series of blanks each comprising a substantially flat piece of metal having a projection thereon, reciprocating means engaging said blank for holding the same in position, and a plurality of horizontally reciprocating tools movable in unison with said feeding means into engagement with said projection to form indentations on opposite sides of the same.

40. An indenting press for forming slider blanks comprising a rotating crankshaft, a vertically movable crosshead reciprocated thereby, a pair of horizontally movable indenting tools, and means for actuating said tools from said crosshead.

41. In an indenting press, a rotating crankshaft and a vertically movable crosshead actuated thereby, a vertically movable holding punch carried by said crosshead, a plurality of horizontally reciprocating indenting tools, and means for actuating said tools from the crosshead.

42. In a machine for making blanks for separable fastener sliders, blanking mechanism for cutting double winged blanks from a metal strip, strip feeding means for feeding a continuous strip to said blanking mechanism, means for bending over side edge portions of said blanks to form flanges, and means for automatically transferring said blanks from the blanking mechanism to said flange bending mechanism.

43. In a machine for making blanks for separable fastener sliders, the combination defined in claim 42 wherein there is also provided shearing mechanism for trimming said flanges to size.

44. In a machine for making blanks for separable fastener sliders, the combination specified in claim 42 wherein there is arranged between the blanking and flange forming mechanisms an indenting press having means for forming opposite indentations in upstanding lugs on said blanks.

45. In a machine for making blanks for separable fastener sliders, strip feeding mechanism for intermittently feeding a continuous metal strip, a blanking press to which said strip is fed for cutting double winged blanks from said metal strip, automatic means for forming a pull attaching projection on one of the wing portions of each blank, forming mechanism for bending over the side edges of said wing portions to form flanges, and means for shearing said flanges to size.

Signed at Meadville, in the county of Crawford, and State of Pennsylvania, this 9th day of May, A. D. 1927.

GIDEON SUNDBACK.